INVENTORS F. R. DENNIS
E. P. FELCH, JR.

Feb. 20, 1945.  F. R. DENNIS ET AL  2,369,663
SYNCHRONIZING SYSTEM
Filed Feb. 28, 1942  2 Sheets-Sheet 2

INVENTORS F. R. DENNIS
E. P. FELCH, JR.
BY
G. H. Heydt
ATTORNEY

Patented Feb. 20, 1945

2,369,663

UNITED STATES PATENT OFFICE 2,369,663

SYNCHRONIZING SYSTEM

Fred R. Dennis, Lyndhurst, and Edwin P. Felch, Jr., Chatham, N. J., assignors to Bell Telephone Laboratories, Incorporated, New York, N. Y., a corporation of New York Application February 28, 1942, Serial No. 432,862

6 Claims. (Cl. 250—36)

This invention relates to synchronizing systems and more particularly to that type of synchronizing system wherein an alternating current generator is maintained at a frequency which is a predetermined difference from a given reference frequency.

Heretofore in the prior art fixed frequency differences were usually obtained by modulating the given reference frequency with the desired frequency difference and selecting through suitable filter networks the sum or difference frequency. However in certain cases, particularly in applications involving precision measurements, this method produces an output containing a number of troublesome, unwanted frequency components which render the measurements unreliable.

In a patent application filed August 3, 1940, by A. F. Pomeroy, Serial No. 350,298, now Patent 2,288,025, a means for maintaining a fixed frequency difference is disclosed comprising a separate oscillator which is maintained at a frequency which is a fixed difference from a given reference frequency. This type of circuit effectively isolates the input circuit of reference frequency from the output circuit and thereby greatly improves the purity of the output derived from the system.

It is the object of this invention to further improve the purity of the output frequency by producing an output frequency differing from a reference frequency by a given amount and which output is substantially entirely devoid of any components equal either to the reference frequency or the maintained difference frequency.

The foregoing object is attained by this invention which provides a voltage source of reference frequency, an oscillator producing an output frequency nominally differing from the reference frequency by a given amount, means for deriving from the oscillator and the reference frequency source a voltage of frequency equal to an integral multiple of the difference between their frequencies, a control voltage source the frequency whereof is substantially equal to the multiplied difference frequency, and means responsive to the control voltage and the voltage of multiplied difference frequency for controlling the oscillator frequency.

The invention may be better understood by referring to the drawings, in which.

Figure 1:
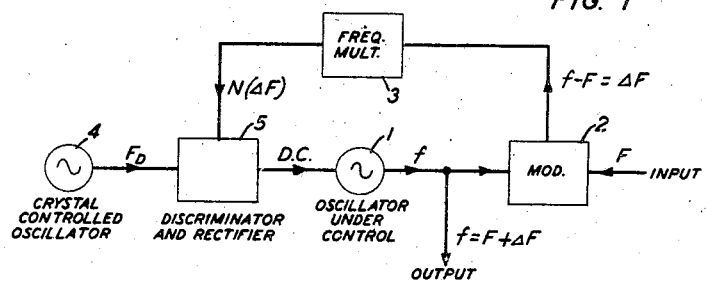
Fig. 1 is a block diagram showing the essential elements of one embodiment of this invention.

Referring now more particularly to Fig. 1 in which reference numeral 1 is an oscillator whose frequency is to be controlled and maintained at a fixed frequency difference $\Delta F$ from the input voltage of reference frequency $F$.

The output voltage of oscillator 1 of frequency $f$ is combined with the reference frequency $F$ in a modulator 2 of conventional design. This modulator preferably contains a suitable filter for selecting the difference frequency $\Delta F$ which difference frequency is multiplied an integral number of times by a frequency multiplier 3. Modulators and frequency multipliers suitable for the practice of this invention are well-known to the art and require no detailed description. A voltage 4 of constant frequency, which is preferably a crystal controlled oscillator, produces an output voltage of frequency $F_D$. This constant frequency voltage is combined in a discriminator 5 with the multiplied difference frequency $N(\Delta F)$. Various types of discriminators and rectifiers may be utilized for the practice of this invention, one such being described in more detail in connection with Fig. 3. This discriminator and rectifier is adapted to produce a direct current voltage varying in magnitude and polarity in proportion to the phase difference between the voltage of multiplied frequency and the voltage from the constant frequency source. As more particularly hereinafter described in connection with Fig. 4 the direct current output voltage will be zero so long as the voltage of multiplied frequency maintains strict quadrature with the constant frequency voltage. Should a phase shift occur one way or the other due to any cause whatsoever, a direct current voltage will be produced which will be proportional to the magnitude and direction of departure from quadrature. This direct current voltage is utilized to control the frequency of oscillator 1 and the circuit constants are so selected that should the frequency of either oscillator 1 or the reference frequency $F$ tend to change slightly it will cause a momentary shift in phase between the multiplied frequency voltage and the constant frequency voltage which is sufficient to produce a direct current voltage of proper magnitude and polarity to correct the frequency of oscillator 1 and keep it locked at a constant frequency difference from the input source of reference frequency F.

Figure 2:
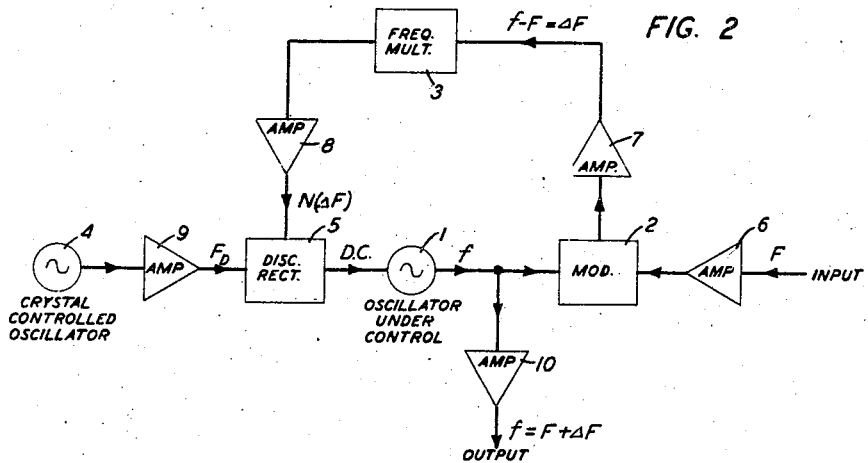
Fig. 2 is another block diagram showing how amplifiers may be added advantageously to the circuit of Fig. 1.

In Fig. 2 the circuit arrangement is substantially the same as that shown and previously described in connection with Fig. 1. In this figure, however, amplifiers 6, 7, 8, 9 and 10 have been included to show locations where they may be most advantageously used. In this figure as well as in Fig. 1 it should be noted that the modulation products from modulator 2 are by reason of the process of frequency multiplication and the use of the discriminator rectifier very thoroughly isolated from the output of oscillator 1 so that the output from amplifier 10 is a substantially pure sine wave of frequency $f$.

Figure 3:
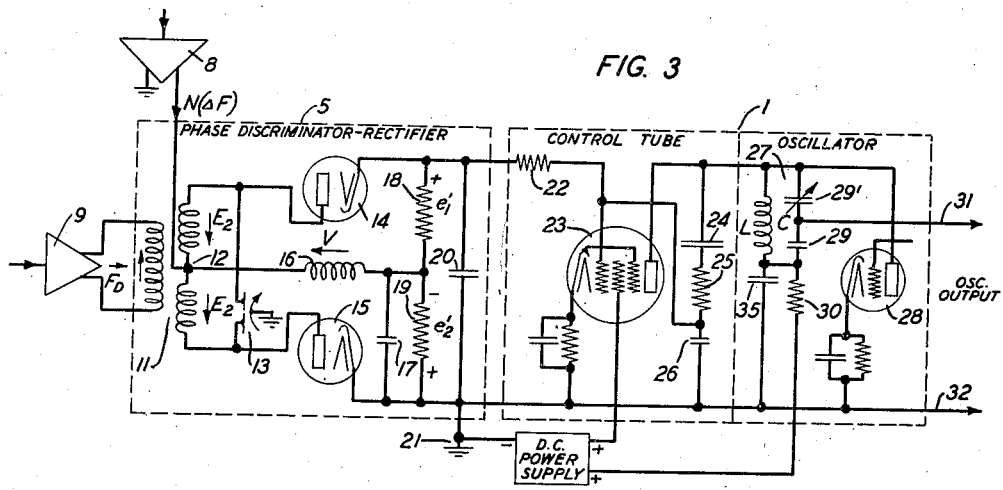
Fig. 3 shows in more detail the circuit of the phase discriminator rectifier and oscillator control system of Fig. 1.

Fig. 3 shows in greater detail the preferred circuits for oscillator 1 and the phase discriminator rectifier 5. In this figure the voltage of constant frequency $F_D$ coming from amplifier 9 is fed into the phase discriminator network 5 by way of the primary of transformer 11. The secondary of this transformer comprises two substantially identical windings, serially connected at point 12. The free ends of these two windings are connected to the plates of two diode rectifiers 14 and 15. Equal resistors 18 and 19 are serially connected between the cathodes of these two diodes and their intermediate junction is connected to junction 12 through an inductor 16. A differential condenser 13 is connected with its stationary plates to the anodes of the two rectifier tubes and with its movable plate to ground. A capacitor 20 is connected across the two serially connected resistors 18 and 19.

It is clear that, assuming perfect symmetry and zero output from amplifier 8, the rectified voltage drop across resistor 18 will be equal and opposite to the rectified voltage drop across resistor 19 so that the net voltage applied across the terminals of capacitor 20 is zero. Differential capacitor 13 is used for achieving this balance and to overcome slight unsymmetrical conditions.

The multiplied frequency difference $N(\Delta F)$ coming from amplifier 8 is applied to the phase discriminator network at junction 12. An alternating current path may be traced through the network from junction 12 through inductor 16, capacitor 17 and to ground 21 through which the circuit returns to amplifier 8. Under normal circumstances the frequency of the multiplied difference frequency from amplifier 8 is equal to the constant frequency $F_D$ coming from amplifier 9 and these voltages have such a phase relationship that the voltage drop V produced across inductor 16 is in quadrature with the secondary voltages $E_2$ induced in the secondaries of transformer 11.

Figure 4:
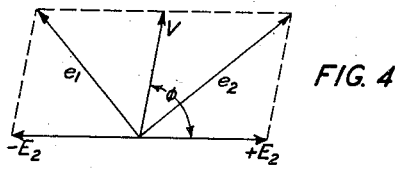
Fig. 4 is a vector diagram illustrating the principles of operation of the phase discriminator.

Referring now to Fig. 4 it will be seen that the vector difference between the voltage V and voltage $E_2$ is equal to the voltage $e_1$ and the vector sum of voltages V and $E_2$ is equal to the voltage $e_2$. So long as the phase angle $\phi$ existing between voltages V and $E_2$ remains 90 degrees, the resultant voltages $e_1$ and $e_2$ will be equal in magnitude. Since their respective rectified components $e_1'$ and $e_2'$ are connected in opposition through resistors 18 and 19, as shown in Fig. 3, their rectified resultant voltage appearing across capacitor 20 remains zero. If, however, as hereinbefore stated there should be a slight shift in frequency of oscillator 1 or of the input reference source it would amount to a phase shift between voltage V and $E_2$. This may, for example, cause angle $\phi$ to become less than 90 degrees as shown in Fig. 4 whereupon voltage $e_2$ becomes greater than voltage $e_1$. This results in the rectified component voltage $e_2'$ becoming greater than the rectified component voltage $e_1'$ so that the lower plate of capacitor 20 becomes positive with respect to its upper plate. Should the frequency tend to shift in the opposite direction so that angle $\phi$ in Fig. 4 becomes greater than 90 degrees the upper plate of capacitor 20 would become positive with respect to its lower plate.

The voltage appearing across capacitor 20 is applied to the control grid of a control tube 23 through a resistor 22 as shown in Fig. 3. The action of this control tube is well-known in the art, as the principles of its operation were described in the Proceedings of the Institute of Radio Engineers, October 1935, page 1135. Its operation, however, in connection with the tank circuit 27 of the oscillator will be described briefly for the purposes of this specification.

Tube 28 is a part of oscillator 1, the circuit whereof may be of any well-known form. The tank circuit 27 comprises an inductor L and a tuning capacitor C formed by two series-connected condensers 29 and 29'. Condenser 35 is a by-pass condenser and resistor 30 supplies the direct current voltage from the direct current power supply to the plates of the control tube 23 and oscillator tube 28.

In parallel with the tank circuit 27 is connected a resistor 25 and a capacitor 26. Capacitor 24 is a blocking condenser. The voltage appearing across the tank circuit 27 therefore appears across the series-connected resistor 25 and capacitor 26. The voltage drops across resistor 25 and capacitor 26, however, are in quadrature, the drop across capacitor 26 lagging the current therethrough by 90 degrees. The resistance of resistor 25 is made relatively large compared with the reactance of capacitor 26 so that the voltage drop across the capacitor 26 lags the voltage across the tank circuit by nearly 90 degrees. The voltage drop across capacitor 26 is applied to the control grid of control tube 23 causing this tube to take current substantially in synchronism with the current through coil L of the tank circuit 27. This causes the control tube 23 to appear as an inductive reactance to the tank circuit of oscillator 1. The magnitude of the current taken by the control tube is controlled by the direct current bias on its control grid which is obtained from capacitor 20 through resistor 22 as hereinbefore described. Consequently the voltage appearing across capacitor 20 in the phase discriminator rectifier network 5 will control the frequency of the oscillator.

The connections throughout the system are so made that should, for example, the frequency of the oscillator under control tend to decrease slightly it will cause voltage vector V to move in the positive direction thereby increasing the phase angle $\phi$ existing between this voltage V and voltage $E_2$. As previously described this will cause the upper plate of capacitor 20 to become more positive with respect to its lower plate which in turn causes the control tube 23 to take a larger current and appear as a smaller inductance to the tank circuit 27. This effective decrease in inductance will cause the frequency of the oscillator under control to increase to its original value. Similar considerations will show the control effective when the reference frequency F tends to shift.

Figure 5:
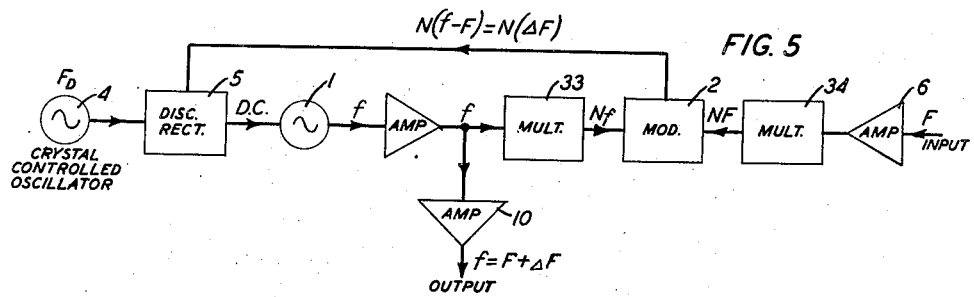
Fig. 5 is a block diagram showing a modification of the invention.

In Fig. 5 the invention is shown in a slightly different form. In this case instead of first obtaining the frequency difference between the oscillator 1 under control and the voltage source of reference frequency coming from amplifier 6 and multiplying this difference frequency, these two frequencies are first multiplied separately by the same amount by separate multipliers 33 and 34. The multiplied difference frequency which is equal to $N(\Delta F)$ is applied directly to the discriminator rectifier network 5. The operation otherwise is substantially identical to that described for Figs. 1 and 2 above. The advantage in using the two frequency multipliers in the manner described is to further isolate the voltage of reference frequency F and the voltage of difference frequency $\Delta F$ from the output of oscillator 1.

It should be noted that by increasing the magnitudes of the multiplying factor N the sensitivity of control is proportionately increased because a phase shift of $\phi$ between voltages V and $E_2$ will result from a phase shift of $\phi/N$ between the voltages of oscillator 1 and the reference frequency F. This provides extremely close frequency control within a fraction of a cycle, the frequency of oscillator 1 being locked to a fixed frequency difference with respect to source F, any attempted departure amounting only to a phase shift.

Figure 6:
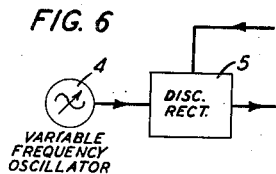
Fig. 6 is another block diagram showing a still further modification.

It is sometimes desirable to be able to quickly change the difference frequency $\Delta F$. In Fig. 6 oscillator 4 is shown variable to provide an easy and rapid means to this end. By reason of the action of the discriminator rectifier 5 the frequency $N(\Delta F)$ is made equal to that of oscillator 4 so that the desired difference frequency $\Delta F$ is a closely controlled function of the frequency of oscillator 4. The accuracy of control will be such that the desired difference frequency $\Delta F$ will be equal to the frequency $F_D$ divided by the multiplying factor N.

While the invention has been described in connection with a preferred form of phase type discriminator, other types of discriminator if properly designed have been found operative and may be substituted. For example, the frequency discriminator disclosed in United States Patent 2,254,601, issued September 2, 1941, to E. P. Felch, or the frequency discriminator disclosed in the Proceedings of the Institute of Radio Engineers, October 1935, page 1127, may be used. However, where exact frequency control is required the phase type discriminator such as the one herein disclosed is preferred over the tuned circuit type.

In actual applications these systems have been found very effective for isolating the unwanted modulation products from the output voltage in highly sensitive self-tuning detector networks used in measuring systems. Without the use of this frequency multiplying feature these systems have been found very unreliable for precision work.

What is claimed is:

1. In a system for automatically maintaining an oscillator electrically locked at any desired predetermined fixed frequency difference from a reference frequency source, the combination comprising a voltage source of reference frequency, an oscillator controllable in frequency in response to an applied direct current voltage, means including at least one frequency multiplier having a fixed multiplying factor for deriving from the oscillator and the reference frequency source a voltage of frequency equal to a multiple of the difference between their frequencies, a voltage source of constant frequency exactly equal to the product of the said desired predetermined fixed frequency difference multiplied by said fixed multiplying factor, an electronic phase discriminator having two alternating current inputs and a direct current output circuit and of the type wherein the direct current output voltage is proportional to the phase angle between the two alternating current input voltages, circuits connecting the said voltage of multiplied difference frequency to one of said alternating current input circuits, other circuits connecting the said voltage of constant frequency to the other alternating current input circuit and circuits connecting the direct current output circuit to said oscillator whereby said oscillator is maintained locked with said reference frequency source but at a frequency differing therefrom exactly equal to said predetermined fixed frequency difference.

2. The combination according to claim 1 wherein said voltage source of constant frequency includes means for adjusting said constant frequency to any desired predetermined value.

3. In a system for automatically maintaining an oscillator electrically locked at any desired predetermined fixed frequency difference from a reference frequency source the combination comprising a voltage source of reference frequency, an oscillator controllable in frequency in response to an applied direct current voltage, means for deriving from the oscillator and the reference frequency source a voltage of difference frequency, a frequency multiplier for multiplying the derived difference frequency by a fixed multiplying factor, a voltage source of constant frequency exactly equal to the product of the said desired predetermined fixed frequency difference multiplied by said fixed multiplying factor, an electronic phase discriminator having two alternating current input circuits and a direct current output circuit and of the type wherein the direct current output voltage is proportional to the phase angle between the two alternating current input voltages, circuits connecting the said voltage of multiplied different frequency to one of said alternating current input circuits, other circuits connecting the said voltage of constant frequency to the other alternating current input circuit, and circuits connecting the direct current output circuit to said oscillator whereby said oscillator is maintained locked with said reference frequency source but at a frequency differing therefrom exactly equal to said predetermined fixed frequency difference.

4. The combination according to claim 3 wherein said voltage source of constant frequency includes means for adjusting said constant frequency to any desired predetermined value.

5. In a system for automatically maintaining an oscillator electrically locked at any desired predetermined fixed frequency difference from a reference frequency source the combination comprising a voltage source of reference frequency, an oscillator controllable in frequency in response to an applied direct current voltage, a frequency multiplier for multiplying the frequency of the reference frequency voltage by a fixed multiplying factor, another frequency multiplier for multiplying the oscillator frequency by a fixed multiplying factor exactly equal to said first-named fixed multiplying factor, means deriving from the two multipliers a voltage of difference frequency which frequency is equal to the difference between said reference frequency and said oscillator frequency multiplied by said fixed multiplying factor, a voltage source of constant frequency exactly equal to the product of the said desired predetermined fixed frequency difference multiplied by said fixed multiplying factor, an electronic phase discriminator having two alternating current input circuits and a direct current output circuit and of the type wherein the direct current output voltage is proportional to the phase angle between the two alternating current input voltages, circuits connecting the said voltage of multiplied difference frequency to one of said alternating current input circuits, other circuits connecting the said voltage of constant frequency to the other alternating current input circuit, and circuits connecting the direct current output circuit to said oscillator whereby said oscillator is maintained locked with said reference frequency source but at a frequency differing therefrom exactly equal to said predetermined fixed frequency difference.

6. The combination according to claim 5 wherein said voltage source of constant frequency includes means for adjusting said constant frequency to any desired predetermined value.

FRED R. DENNIS.
EDWIN P. FELCH, JR.